(12) United States Patent
Venkatesh et al.

(10) Patent No.: US 7,120,647 B2
(45) Date of Patent: Oct. 10, 2006

(54) WEB-BASED METHOD AND SYSTEM FOR PROVIDING EXPERT INFORMATION ON SELECTED MATTERS

(75) Inventors: Sambedu Venkatesh, New Haven, CT (US); Debarghya Sengupta, New Haven, CT (US); Sukhminder Grewal, New Haven, CT (US)

(73) Assignee: General Electric Company, Schenectady, NY (US)

( * ) Notice: Subject to any disclaimer, the term of this patent is extended or adjusted under 35 U.S.C. 154(b) by 944 days.

(21) Appl. No.: 10/020,365

(22) Filed: Oct. 30, 2001

(65) Prior Publication Data

US 2003/0101083 A1    May 29, 2003

(51) Int. Cl.
*G06F 7/00* (2006.01)

(52) U.S. Cl. ..................... 707/104.1; 707/10
(58) Field of Classification Search .......... 705/8, 705/9, 50; 707/10, 5, 104.1; 709/219; 715/733; 379/226.01, 265.06; 370/270

See application file for complete search history.

(56) References Cited

U.S. PATENT DOCUMENTS

| | | | |
|---|---|---|---|
| 5,159,685 A | 10/1992 | Kung | |
| 5,295,230 A | 3/1994 | Kung | |
| 5,337,320 A | 8/1994 | Kung | |
| 5,388,189 A | 2/1995 | Kung | |
| 5,862,223 A * | 1/1999 | Walker et al. | 705/50 |
| 6,134,318 A * | 10/2000 | O'Neil | 379/266.01 |
| 6,177,932 B1 * | 1/2001 | Galdes et al. | 715/733 |
| 6,223,165 B1 * | 4/2001 | Lauffer | 705/8 |
| 6,230,287 B1 * | 5/2001 | Pinard et al. | 714/31 |
| 6,418,432 B1 * | 7/2002 | Cohen et al. | 707/5 |
| 6,471,521 B1 * | 10/2002 | Dornbush et al. | 434/322 |
| 6,477,531 B1 * | 11/2002 | Sullivan et al. | 707/10 |
| 6,490,350 B1 * | 12/2002 | McDuff et al. | 379/265.06 |
| 6,493,000 B1 * | 12/2002 | Wynn et al. | 715/733 |
| 6,513,013 B1 * | 1/2003 | Stephanou | 705/9 |
| 6,535,492 B1 * | 3/2003 | Shtivelman | 370/270 |
| 6,691,159 B1 * | 2/2004 | Grewal et al. | 709/219 |
| 6,829,585 B1 * | 12/2004 | Grewal et al. | 705/8 |
| 6,963,899 B1 * | 11/2005 | Fernandez et al. | 709/203 |
| 6,981,040 B1 * | 12/2005 | Konig et al. | 709/224 |
| 7,028,312 B1 * | 4/2006 | Merrick et al. | 719/330 |

* cited by examiner

*Primary Examiner*—Frantz Coby
(74) *Attorney, Agent, or Firm*—Armstrong Teasdale LLP

(57) ABSTRACT

A method for providing expert information from a pool of experts using a server system coupled to a centralized database and at least one client system is provided. The database stores expert information relating to each expert within the pool of experts. The method includes displaying information on the client system identifying alternative paths for assistance to the user, receiving a request from the client system based on an alternative path selected by the user, accessing a database within the server system comprising a pool of experts, cross-referencing user information with expert information, displaying expert information including expert availability information on the client system through an applet downloaded from the server system when a user calls upon an expert to seek assistance, and contacting the expert based on user selected expert information inputted into the client system.

43 Claims, 14 Drawing Sheets

PHOTO NOT AVAILABLE — 852

EMAIL ME

NAME — 854 : ATUL
BUSINESS — 860 : CAPITAL SERVICES
SUB-BUSINESS — 858 : iPROCESS E-BUSINESS/
FUNCTION — 866 : INFORMATION TECHNOLOGY
EXPERTISE — 868 : ACCESS, ASP, HTML, VISUAL FOXPRO, MS SQL SERVER, WORD, PPT, VB
LOCATION — 856 : HI-TECH CITY, MADHAPUR, HYDERABAD

864 { PHONE : 91 040
       DIAL COMM : 742
       EMAIL : ATUL. — 880 @

862 — PREFERRED LANGUAGE : ENGLISH
EXPERT IN: ASP, ACCESS, EXCEL, HTML, JAVA, JAVASCRIPT, MS INTERNET
870 EXPLORER, MS OUTLOOK, POWERPOINT, SQL SERVER, SUPPORTCENTRAL EXPERTS, SUPPORTCENTRAL OVERVIEW & HELP, VISIO, VISUAL BASIC, VISUAL BASIC FOR APPLICATIONS, VISUAL FOXPRO, WINDOWS 95/98/2000/NT, WORD

MONTHLY AVAILABILITY
«OCTOBER 2001»
| SU | MO | TU | WE | TH | FR | SA |
|----|----|----|----|----|----|----|
|    | 1  | 2  | 3  | 4  | 5  | 6  |
| 7  | 8  | 9  | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |    |    |    |

FAVORITE LINKS & DOCUMENTS:
DISPLAYING 1-5 OF 13 DOCUMENTS. — 878
▷ ASP VS DHTML
▷ ASP-DATABASE COMMUNICATION
▷ ASP-DOME FAQ
▷ CDONTS-AN OVERVIEW
▷ ASP-SAMPLE CODES
MORE (8)...

— 872

874 — CASES SOLVED BY EXPERT
FEED BACK OF EXPERT FROM OTHER USERS — 876
○ VIEW PREVIOUS CASES
○ VIEWPREVIOUS FEEDBACK
○ HOME PAGE — 886

| CURRENTLY AVAILABLE IN | | 882 | 884 |
|---|---|---|---|
| ASP | EMAIL | CHAT | PHONE |
| ACCESS | EMAIL | CHAT | PHONE |
| EXCEL | EMAIL | CHAT | PHONE |
| HTML | EMAIL | CHAT | |
| JAVASCRIPT | EMAIL | CHAT | |
| MS INTERNET EXPLORER | EMAIL | CHAT | |
| MS OUTLOOK | EMAIL | CHAT | |
| POWERPOINT | EMAIL | CHAT | |
| SQL SERVER | EMAIL | | |
| SUPPORTCENTRAL EXPERTS | | | |

FIG. 11

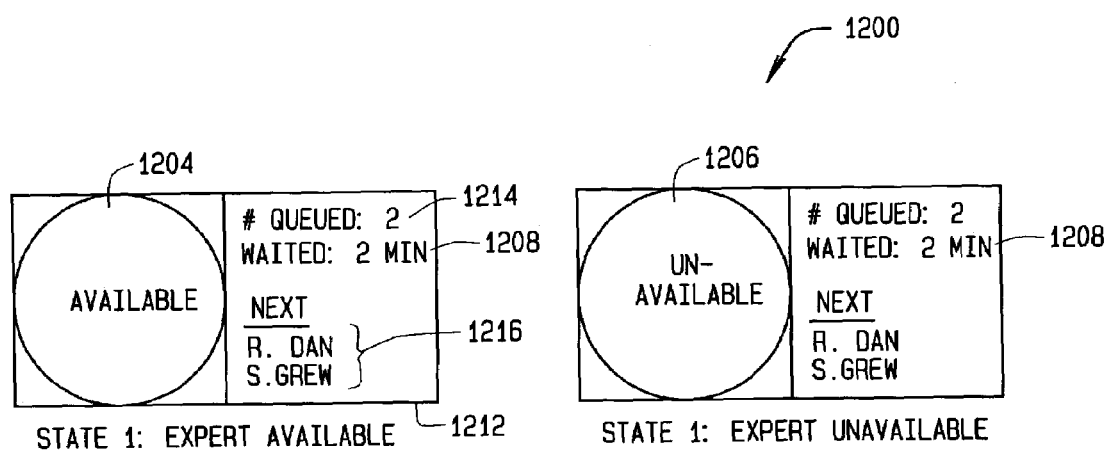
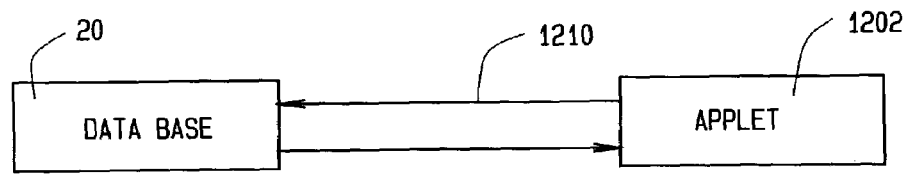
FIG. 15

WEB-BASED METHOD AND SYSTEM FOR PROVIDING EXPERT INFORMATION ON SELECTED MATTERS

BACKGROUND OF THE INVENTION

This invention relates generally to a computer network-based system and more particularly to a system and method for providing expert information to users on a variety of matters.

For business entities having numerous employees located in multiple divisions worldwide, getting expert assistance on a timely basis on a variety of matters may be a major challenge. During the course of a typical work day, issues might arise where expert assistance is required. These issues might relate to a plurality of business related communities including information technology, finance, manufacturing, engineering, risk management, quality, human resources, environmental, health and safety, legal, and corporate. Locating a person within an organization with the appropriate expertise to resolve a particular issue and in a timely fashion may be a difficult task.

Another challenge may involve getting an opportunity to discuss the problem with a qualified expert. During the process of locating a qualified expert and finding a mutually convenient time to discuss the issue, there may be a significant delay as numerous messages and phone calls are exchanged. For example, when a user desires to obtain expert help to resolve an issue, the user may use one of the traditional methods to communicate such as a telephone, via the Internet on the World Wide Web, or voice mails. However, these methods can be cumbersome, impersonal, time consuming and in some cases, the information is provided by someone lacking the necessary expertise.

BRIEF DESCRIPTION OF THE INVENTION

In one aspect, a method for providing expert information from a pool of experts using a server system coupled to a centralized database and at least one client system is provided. The database stores expert information relating to each expert within the pool of experts. The method includes displaying information on the client system identifying alternative paths for assistance to the user, receiving a request from the client system based on an alternative path selected by the user, accessing a database within the server system comprising a pool of experts, cross-referencing user information with expert information, displaying expert information including expert availability information on the client system through an applet downloaded from the server system when a user calls upon an expert to seek assistance, and contacting the expert based on user selected expert information inputted into the client system.

In another aspect, a system for providing expert information from a pool of experts is provided. The system includes a client system with a browser, a database for storing expert information for the pool of experts, and a server system configured to be coupled to the client system and the database. The server system is further configured to display information on the client system identifying alternative paths for assistance to the user, receive a request from the client system based on an alternative path selected by the user, access expert information from the database based on the alternative path selected by the user, cross-reference user information with expert information, display expert information including expert availability information on the client system through an applet downloaded from the server system when a user calls upon an expert to seek assistance, and contact the expert based on user selected expert information inputted into the client system.

BRIEF DESCRIPTION OF THE DRAWINGS

FIG. 8 is an exemplary embodiment of a user interface displaying where an expert's availability schedule is inputted;

FIG. 9 is an exemplary embodiment of a user interface displaying where an expert's shift timings are inputted;

FIG. 10 is another exemplary embodiment of a user interface displaying expert information for a selected expert from the pool of experts;

FIG. 11 is an exemplary embodiment of a user interface displaying the top five experts that match a selection criteria;

FIG. 15 is an exemplary embodiment of a graphical applet depicting expert availability as well as unavailability.

DETAILED DESCRIPTION OF THE INVENTION

A support portal (Supportal) that assists users on a variety of issues is described. The Supportal, in an exemplary embodiment, is a single entry point through which individuals can seek support, training and action. The Supportal further provides an integrated approach to providing internal users or customers with education, information and computer assisted or human help on a specific subject, problem or project.

Figure 1:
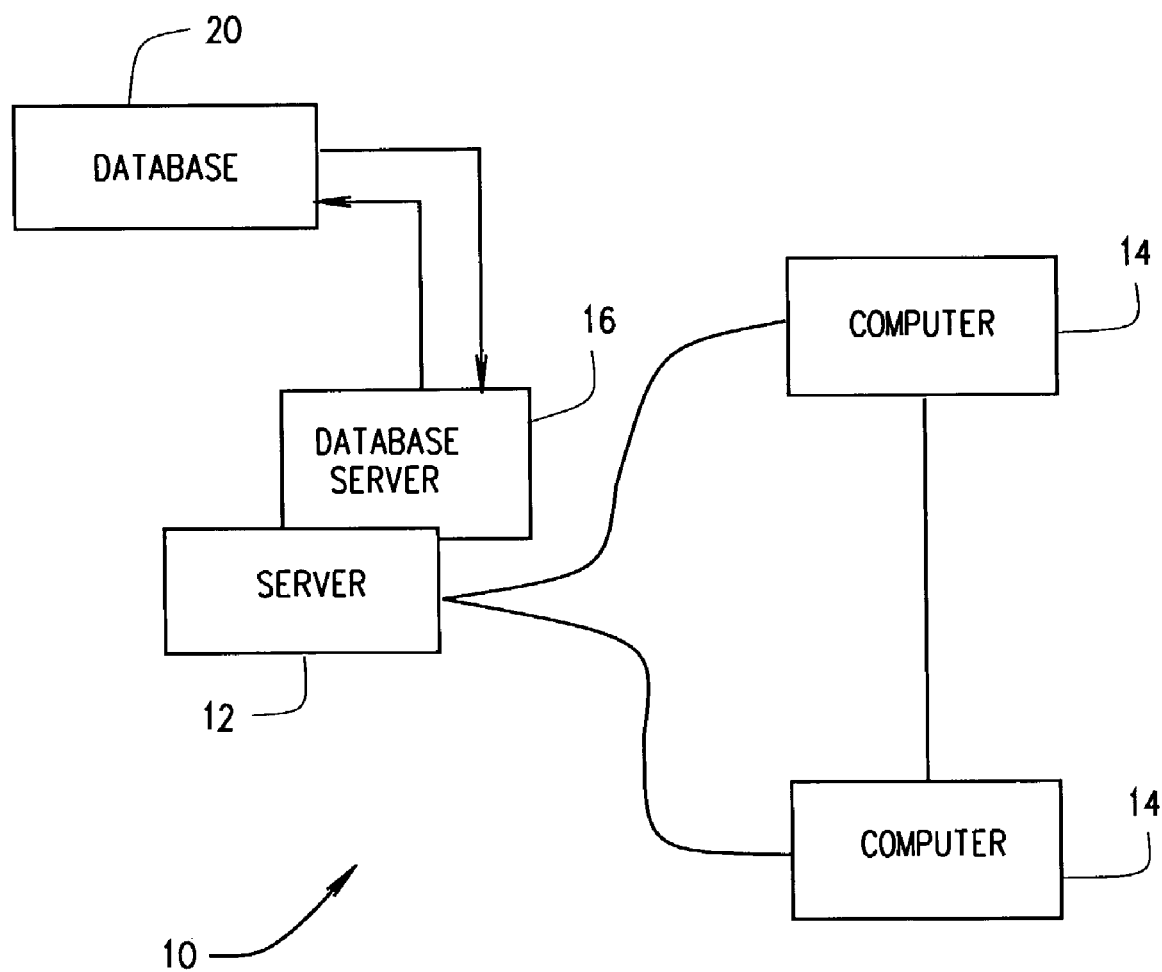
FIG. 1 is a simplified system block diagram in accordance with one embodiment of the present invention.

FIG. 1 is a simplified block diagram of a system 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
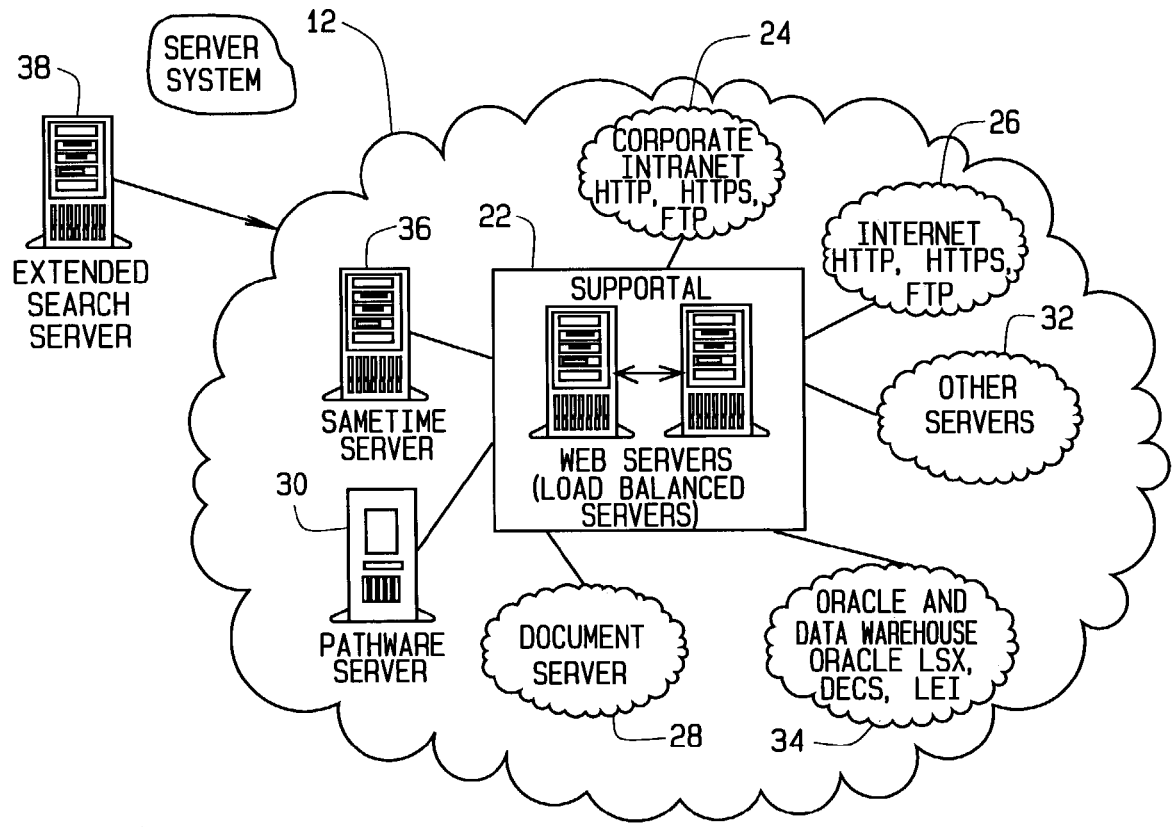
FIG. 2 is an expanded version block diagram of an exemplary embodiment of server architecture of the system shown in FIG. 1.

FIG. 2 is an overview of server system 12. Supportal 22, web servers which are load-balanced, facilitate the discovery of information. Information exists in many formats and in many locations. Using a variety of connection methods, Supportal 22 connects a user with the information. Supportal 22 can, for example, direct users to a corporate intranet 24, the Internet 26, document server 28, pathware server 30 and other types of servers 32. In addition, the server uses databases 34 such as Oracle LSX, LEI and DECS to exchange information with other databases. In addition, Supportal 22 also provides Instant Messaging, Chat Room and Webinar services by utilizing Sametime (or other "Chat" software) server 36. Server system 12 also includes an extended search server 38 for extended search to index content linked to Supportal 22 and to allow the user to search for information.

Figure 3A:
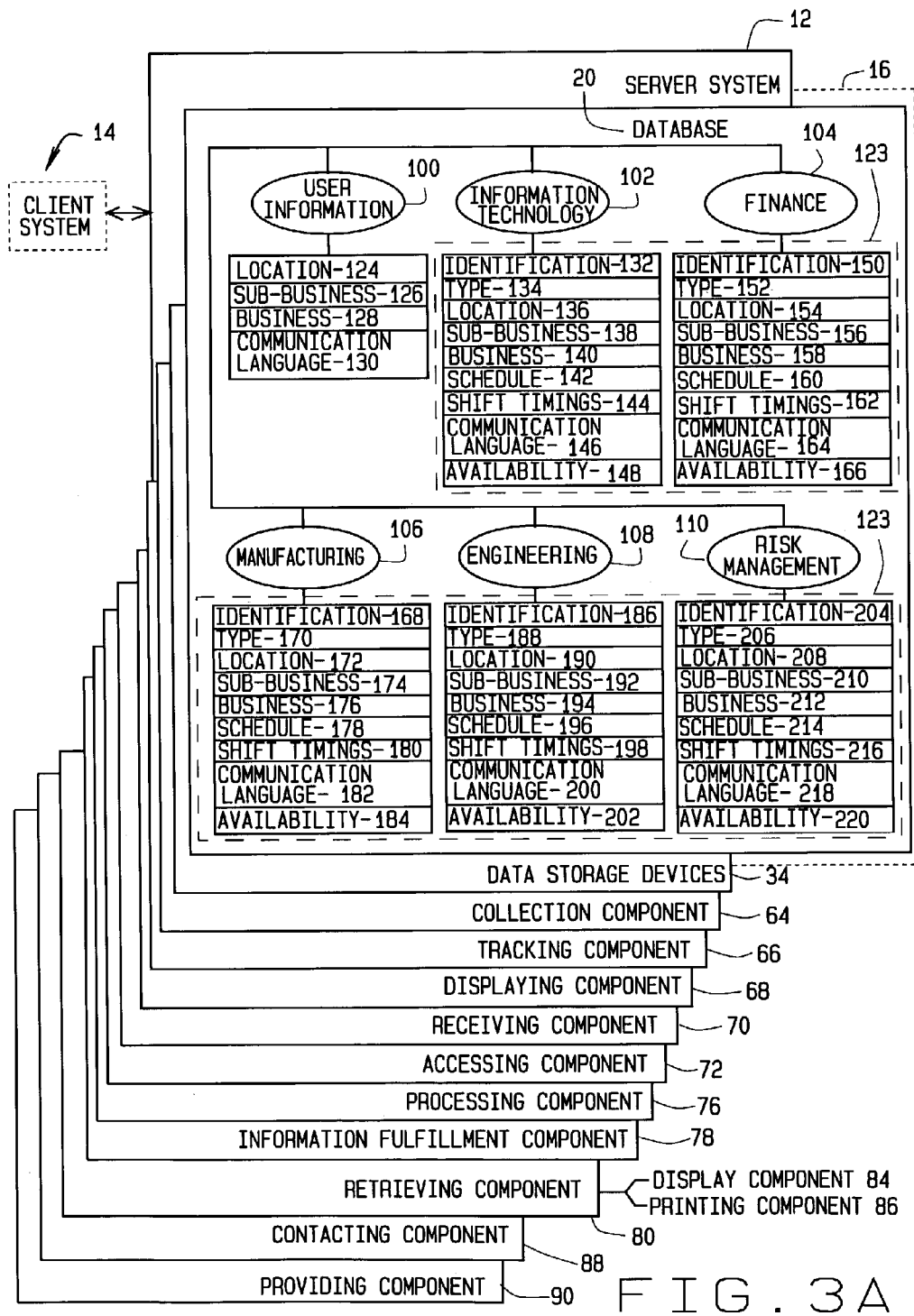
FIG. 3A shows a configuration of the database shown in FIG. 1.
Figure 3B:
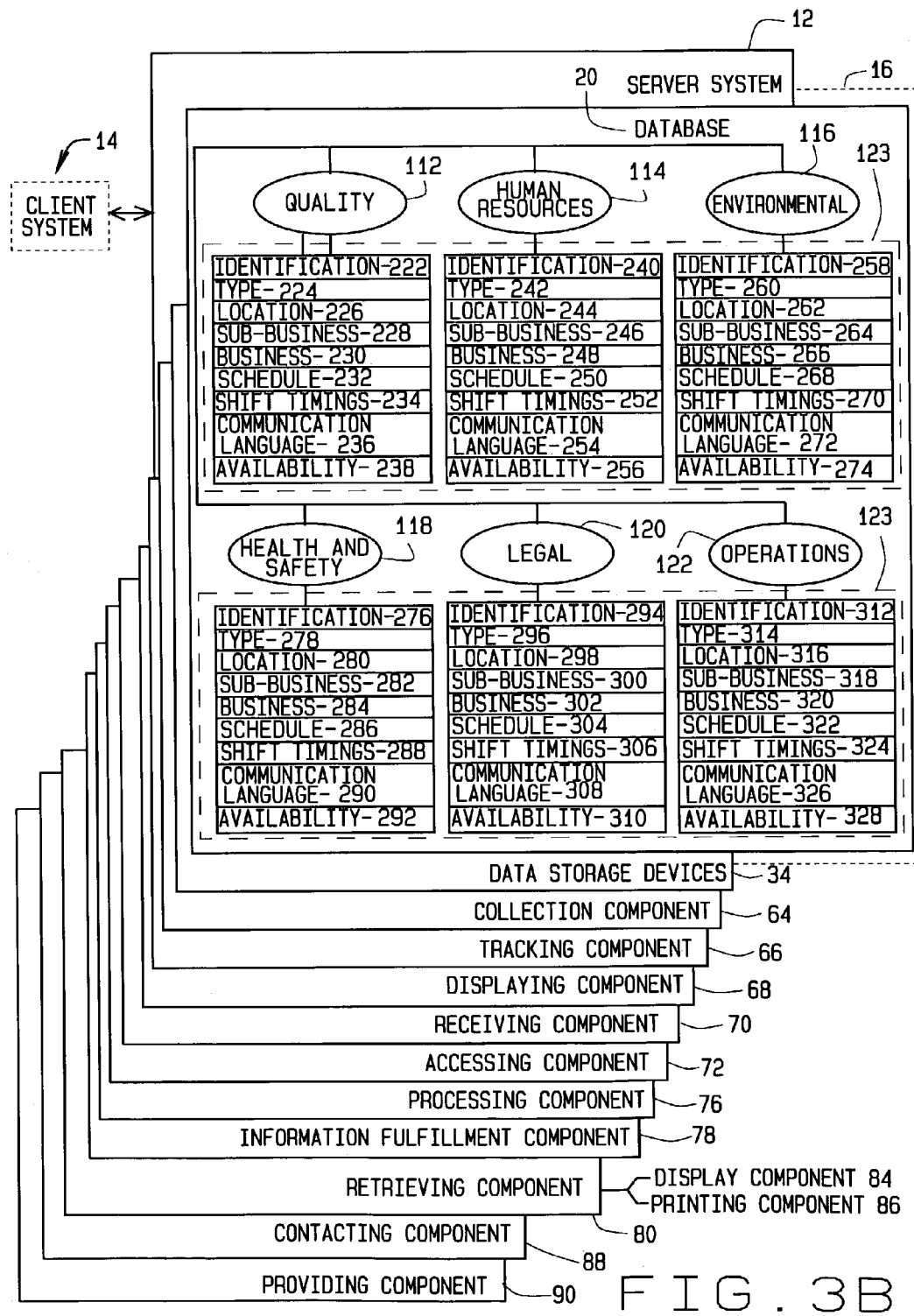
FIG. 3B shows a further configuration of the database shown in FIG. 1.

FIGS. 3A and 3B show a configuration of database 20 within database server 16 of server system 12 shown in FIG. 1. Database 20 is coupled to several separate computer software components within server system 12, which perform specific tasks. Server system 12 includes a collection component 64 for collecting data from users in database 20, a tracking component 66 for tracking data, and a displaying component 68 to display information. Tracking component 66 tracks and cross-references data, including modifying existing data. Server system 12 also includes a receiving component 70 to receive a specific query from client system 14, and an accessing component 72 to access database 20 within server system 12. Receiving component 70 is programmed for receiving a query from one of a plurality of users. Server system 12 further includes a processing component 76 for searching and processing received queries against database 20 containing a variety of information collected by collection component 64. An information fulfillment component 78, located in server system 12, downloads the requested information to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 also includes a display component 84 that is configured to download information to be displayed on a client system's graphical user interface and a printing component 86 that is configured to print information. System 10 is flexible and is not constrained to the options set forth above.

Server system 12 also includes a contacting component 88 and a providing component 90. Contacting component 88 electronically transmits a message to a selected expert from client system 14. Providing component 90 electronically provides a response from the expert user to client system 14. In one embodiment, collection component 64, tracking component 66, displaying component 68, receiving component 70, processing component 76, information fulfillment component 78, retrieving component 80, display component 84, printing component 86, contacting component 88, and providing component 90 are computer programs embodied on computer readable medium.

Database 20 stores user information 100 inputted through client system 14. Database 20 is also divided into a variety of functional communities including at least one of Information Technology 102, Finance 104, Manufacturing 106, Engineering 108, Risk Management 110, Quality 112, Human Resources 114, Environmental 116, Health and Safety 118, Legal 120, and Operations 122, which facilitate database 20 in the storage of expert information 123. FIG. 3A shows functional communities Information Technology 102, Finance 104, Manufacturing 106, Engineering 108, and Risk Management 110. FIG. 3B shows functional communities Quality 112, Human Resources 114, Environmental 116, Health and Safety 118, Legal 120, and Operations 122. The communities stored on database 20 are not limited to those shown herein, but rather are exemplary. Accordingly, numerous other communities could be stored on database 20. User information 100 is inputted through client system 14 and includes location of user 124, sub-business of user 126, business of user 128, communication language of user 130, and functional affiliation of user, e.g., one of the functional communities 102, 104, 106, 108, 110, 112, 114, 116, 118, 120, and 122.

Information Technology 102 includes expert information 123 relating to a pool of experts in the information technology community including at least one of identification of each expert 132, type of each expert 134, location of each expert 136, sub-business of each expert 138, business of each expert 140, schedule of each expert 142, shift timings of each expert 144, communication language of each expert 146, and availability of each expert 148. Expert information 123 is retrieved from Information Technology 102 based on inputs to client system 14 and user information 100. Tracking component 66 updates database 20 as it revises expert information relating to Information Technology 102.

Finance 104 includes expert information 123 relating to a pool of experts in the financial community including at least one of identification of each expert 150, type of each expert 152, location of each expert 154, sub-business of each expert 156, business of each expert 158, schedule of each expert 160, shift timings of each expert 162, communication language of each expert 164, and availability of each expert 166. Expert information 123 is retrieved from Finance 104 based on inputs to client system 14 and user information 100. Tracking component 66 updates database 20 as it revises expert information relating to Finance 104.

Manufacturing 106 includes expert information 123 relating to a pool of experts in the manufacturing community including at least one of identification of each expert 168, type of each expert 170, location of each expert 172, sub-business of each expert 174, business of each expert 176, schedule of each expert 178, shift timings of each expert 180, communication language of each expert 182, and availability of each expert 184. Expert information 123 is retrieved from Manufacturing 106 based on inputs to client system 14 and user information 100. Tracking component 66 updates database 20 as it revises expert information relating to Manufacturing 106.

Engineering 108 includes expert information 123 relating to a pool of experts in the engineering community including at least one of identification of each expert 186, type of each expert 188, location of each expert 190, sub-business of each expert 192, business of each expert 194, schedule of each expert 196, shift timings of each expert 198, communication language of each expert 200, and availability of each expert 202. Expert information 123 is retrieved from Engineering 108 based on inputs to client system 14 and user information 100. Tracking component 66 updates database 20 as it revises expert information relating to Engineering 108.

Risk Management 110 includes expert information 123 relating to a pool of experts in the risk management community including at least one of identification of each expert 204, type of each expert 206, location of each expert 208, sub-business of each expert 210, business of each expert 212, schedule of each expert 214, shift timings of each expert 216, communication language of each expert 218, and availability of each expert 220. Expert information 123 is retrieved from Risk Management 110 based on inputs to client system 14 and user information 100. Tracking component 66 updates database 20 as it revises expert information relating to Risk Management 110.

Quality 112 includes expert information 123 relating to a pool of experts in the quality community including at least one of identification of each expert 222, type of each expert 224, location of each expert 226, sub-business of each expert 228, business of each expert 230, schedule of each expert 232, shift timings of each expert 234, communication language of each expert 236, and availability of each expert 238. Expert information 123 is retrieved from Quality 112 based on inputs to client system 14 and user information 100. Tracking component 66 updates database 20 as it revises expert information relating to Quality 112.

Human Resources 114 includes expert information 123 relating to a pool of experts in the human resources community including at least one of identification of each expert 240, type of each expert 242, location of each expert 244, sub-business of each expert 246, business of each expert 248, schedule of each expert 250, shift timings of each expert 252, communication language of each expert 254, and availability of each expert 256. Expert information 123 is retrieved from Human Resources 114 based on inputs to client system 14 and user information 100. Tracking component 66 updates database 20 as it revises expert information relating to Human Resources 114.

Environmental 116 includes expert information 123 relating to a pool of experts in the environmental community including at least one of identification of each expert 258, type of each expert 260, location of each expert 262, sub-business of each expert 264, business of each expert 266, schedule of each expert 268, shift timings of each expert 270, communication language of each expert 272, and availability of each expert 274. Expert information 123 is retrieved from Environmental 116 based on inputs to client system 14 and user information 100. Tracking component 66 updates database 20 as it revises expert information relating to Environmental 116.

Health and Safety 118 includes expert information 123 relating to a pool of experts in the health and safety community including at least one of identification of each expert 276, type of each expert 278, location of each expert 280, sub-business of each expert 282, business of each expert 284, schedule of each expert 286, shift timings of each expert 288, communication language of each expert 290, and availability of each expert 292. Expert information 123 is retrieved from Health and Safety 118 based on inputs to client system 14 and user information 100. Tracking component 66 updates database 20 as it revises expert information relating to Health and Safety 118.

Legal 120 includes expert information 123 relating to a pool of experts in the legal community including at least one of identification of each expert 294, type of each expert 296, location of each expert 298, sub-business of each expert 300, business of each expert 302, schedule of each expert 304, shift timings of each expert 306, communication language of each expert 308, and availability of each expert 310. Expert information 123 is retrieved from Legal 120 based on inputs to client system 14 and user information 100. Tracking component 66 updates database 20 as it revises expert information relating to Legal 120.

Operations 122 includes expert information 123 relating to a pool of experts in the operations/corporate community including at least one of identification of each expert 312, type of each expert 314, location of each expert 316, sub-business of each expert 318, business of each expert 320, schedule of each expert 322, shift timings of each expert 324, communication language of each expert 326, and availability of each expert 328. Expert information 123 is retrieved from Operations 122 based on inputs to client system 14 and user information 100. Tracking component 66 updates database 20 as it revises expert information relating to Operations 122.

System 10 accumulates a variety of confidential data, and accordingly includes different access levels to control and monitor the security of the system. Authorization for access is assigned by system administrators on a need to know basis. In one embodiment, system 10 provides access based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are exemplary only. Other architectures are possible and can be utilized in connection with practicing the processes described below.

Figure 4:
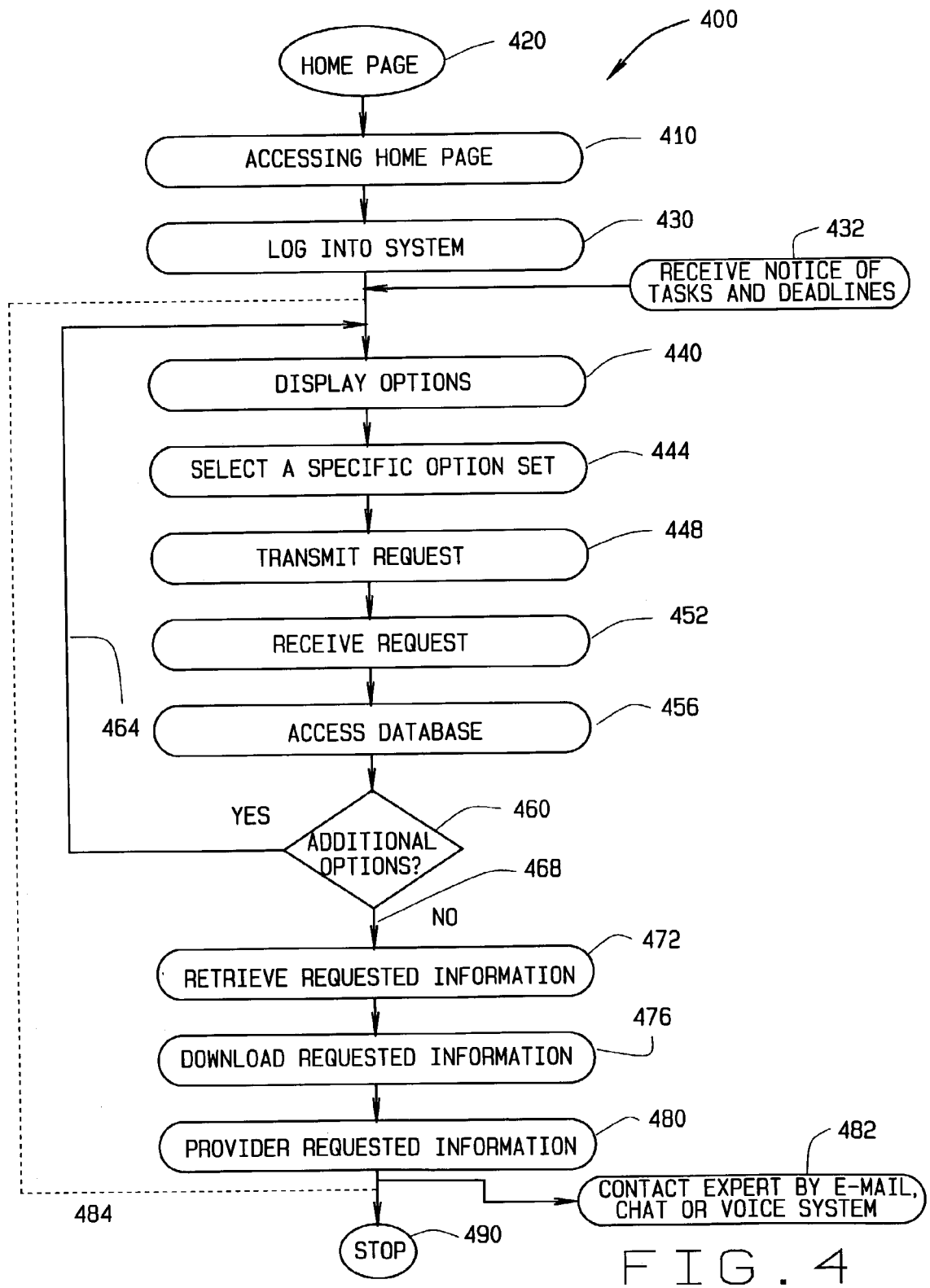
FIG. 4 is a flowchart of the processes employed by the server to facilitate use.

FIG. 4 is a flowchart 400 illustrating an exemplary process employed by system 10. Initially, the user accesses 410 a user interface such as a home page 420 of the web site through client system 14 (shown in FIG. 1). In one embodiment, client system 14, as well as server system 12, are protected from access by unauthorized individuals. The user logs-in 430 to system 10 using a password (not shown) or an employee payroll number for security. Client system 14 receives 432 requested expert information from server system 12, and displays 440 options available to the user through links, check boxes, or pull-down lists. The user selects 444 an option from the available links, and the request is transmitted 448 to server system 12. In one embodiment, the options relate to at least one of organization, function, and location. The request is transmitted 448, in the exemplary embodiment, either by clicking a mouse or through a voice command.

Once server system 12 (shown in FIG. 1) receives 452 the request, server system 12 accesses 456 database 20 (shown in FIG. 1). System 10 determines 460 if additional narrowing options are available. If additional narrowing options are available 464, system 10 displays 440 the additional options. The user selects 444 from the additional options and transmits the request 448. Server system 12 receives the request 452 and accesses 456 database 20. When system 10 determines 460 that additional options are not available 468, system 10 retrieves 472 requested information from database 20. The requested information, including the availability of the experts, is downloaded 476 and provided 480 to client system 14 from server 12. Client system 14 can contact a selected expert 482 by e-mail, chat, or voice system. The user can continue to search 484 database 20 for other information or exit 490 from system 10.

In the exemplary embodiment, system 10 is accessed through a home page which provides the user with the ability to navigate and search information. The system allows a user to navigate, search, and in some cases create/edit/delete online documentation, manuals (also available in downloadable format), frequently asked questions, articles & URL's, various pages and other discussion materials. When a first-time user enters the site, the user is presented with a generic page (not shown). After the user "signs up" for the system, a "cookie" is established on the user's computer, which allows the system to customize the page on next return. Each home page also consists of several pre-set frames (not shown).

Figure 5:
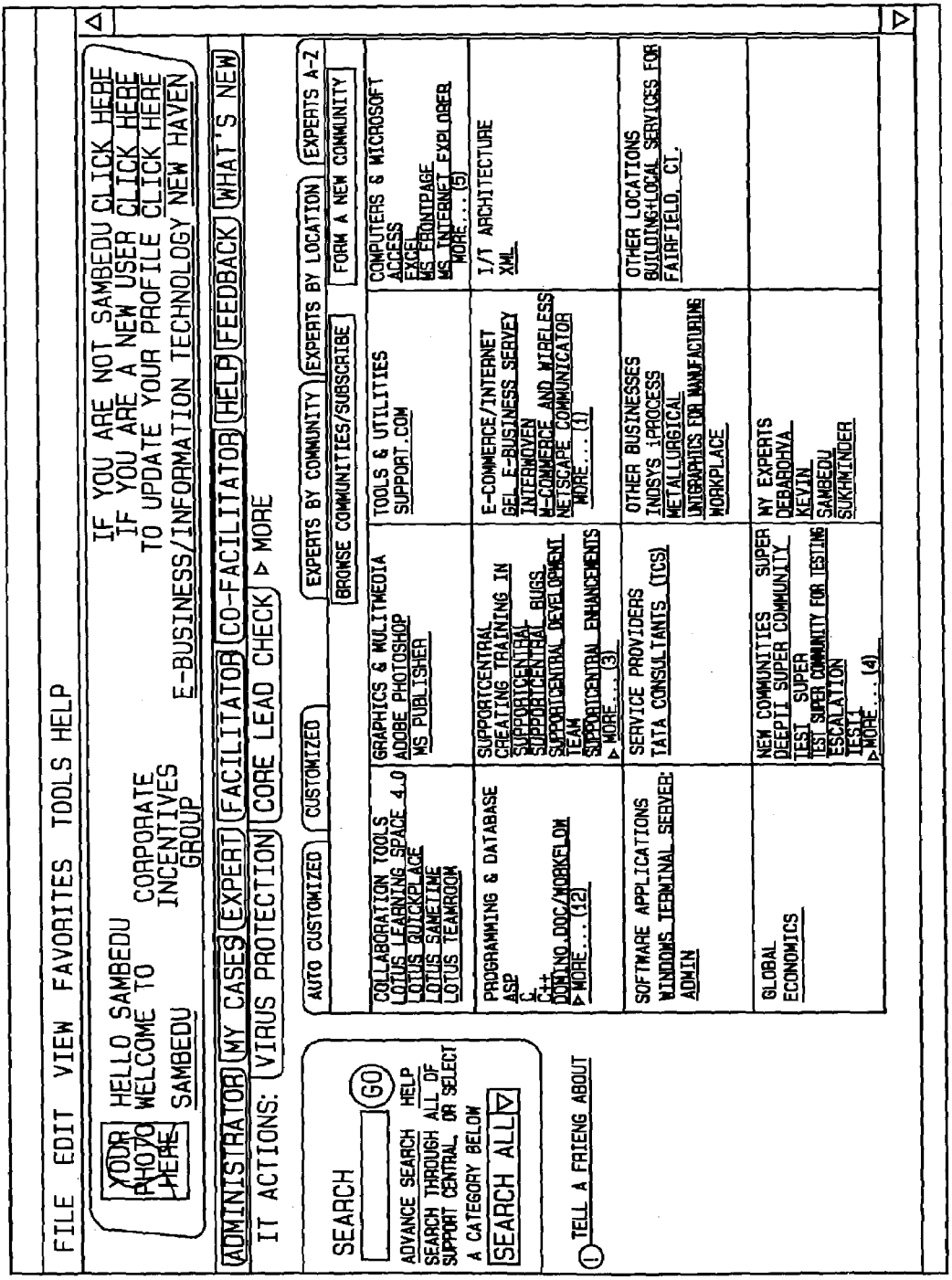
FIG. 5 is an exemplary embodiment of a user interface downloaded on a client system by the server system after the user has logged on to the site.

FIG. 5 is a first-user interface 500 downloaded to client system 14 by server system 12 after the user has logged on to the site. First-user interface 500 provides various alternative hypertext links to the user.

Figure 6:
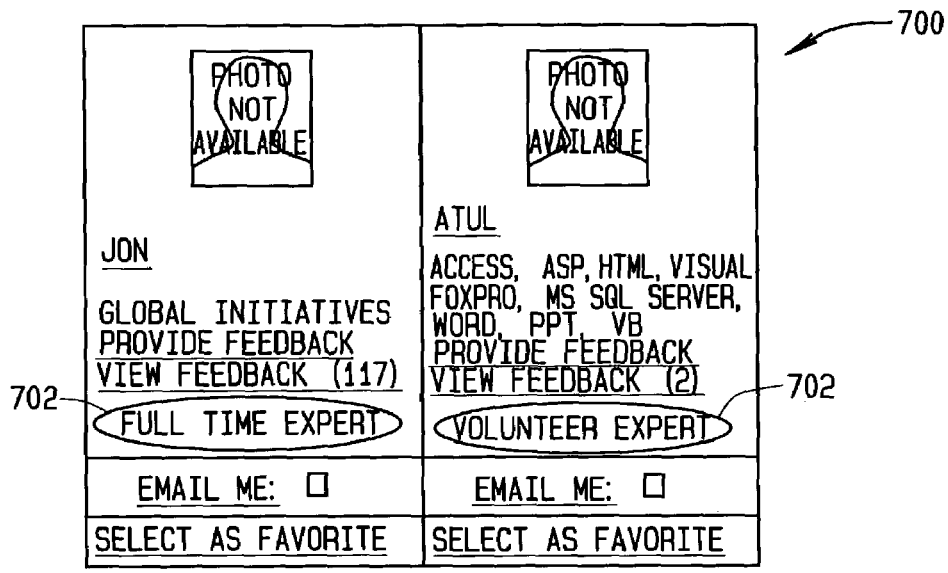
FIG. 6 is an exemplary embodiment of a user interface displaying the type of expert.

FIGS. 6–10 are exemplary embodiments of various user interfaces that display expert information 123 (shown in FIGS. 3A and 3B) for each expert within a pool of experts stored on database 20 (shown in FIGS. 3A and 3B). FIG. 6 is an exemplary embodiment of user interface 700 displaying the type 702 of each expert, e.g., whether the expert is a "full-time" expert or a "volunteer" expert.

Figure 7:
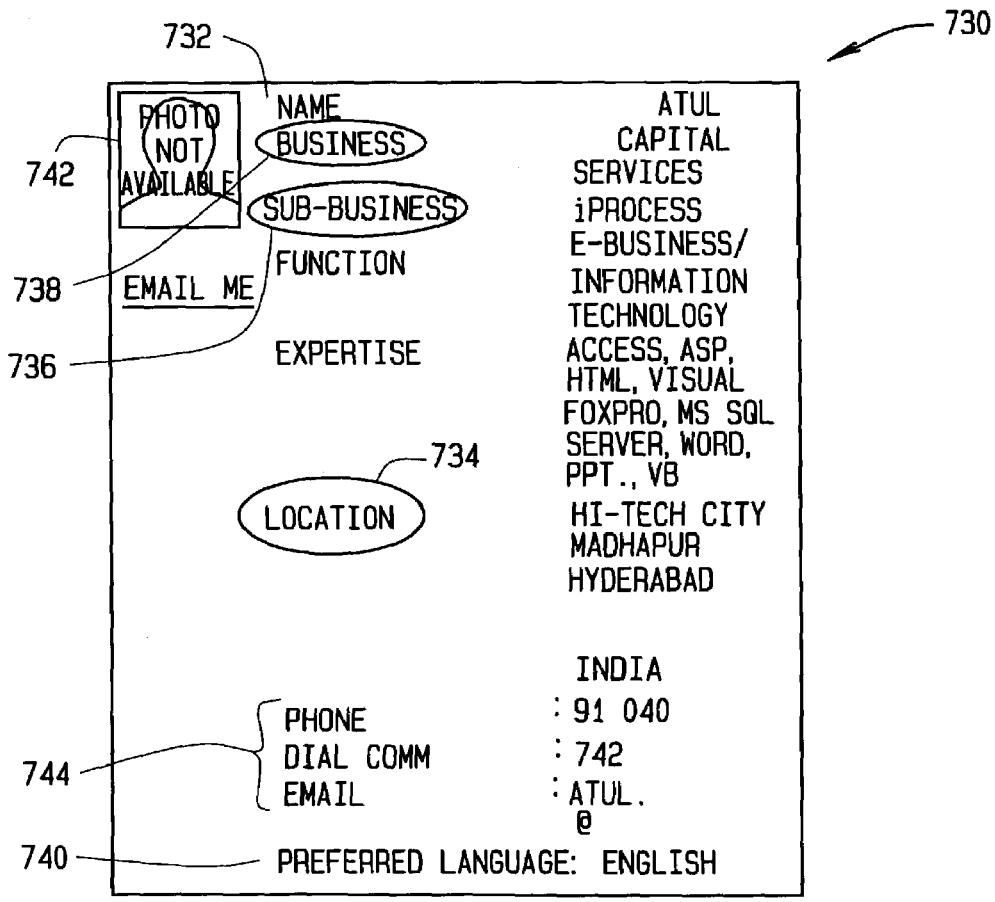
FIG. 7 is an exemplary embodiment of a user interface displaying expert information for a selected expert from the pool of experts.

FIG. 7 illustrates an exemplary embodiment of a user interface 730. More specifically, interface 730 displays expert information 123 (shown in FIGS. 3A and 3B) for a selected expert in a pool of experts including at least one of identification of expert 732, location of expert 734, sub-business of expert 736, business of expert 738, communication language of expert 740, photograph of expert 742, and contact information 744 for the selected expert.

Figures 8, 9:
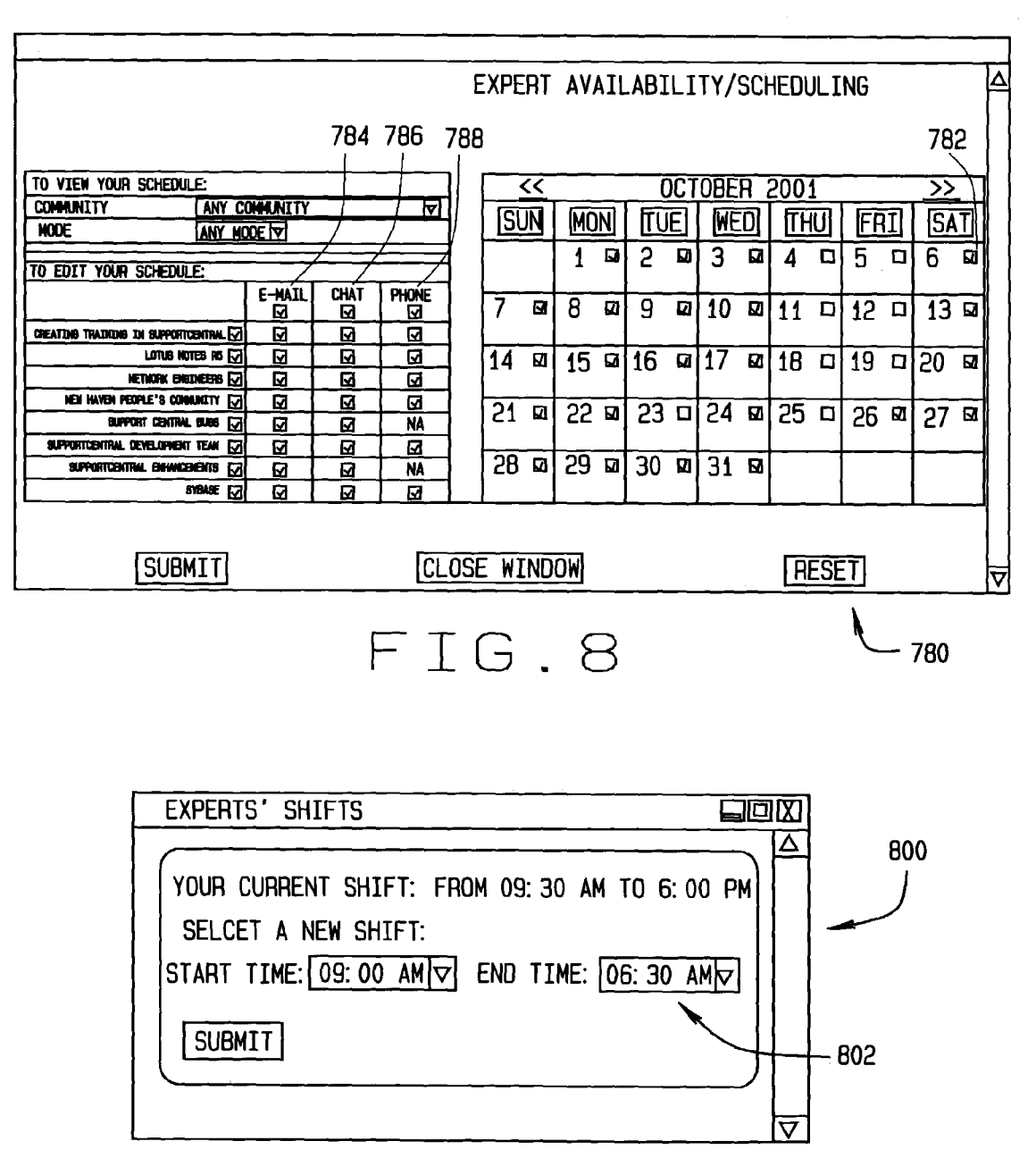

FIG. 8 illustrates an exemplary embodiment of a user interface 780. More specifically, interface 780 displays an expert's schedule to enable a user to determine when a particular expert is available to provide assistance. User interface 780 includes a calendar 782 illustrating the dates and times when an expert is available to provide assistance to users. User interface 780 also displays whether the expert is available by e-mail 784, chat 786, or phone 788.

FIG. 9 illustrates an exemplary embodiment of a user interface 800 which displays an expert's shift timings 802, such that a user can determine an exact time when a particular expert is available to provide assistance.

FIG. 10 illustrates an exemplary embodiment of a user interface 850 that displays expert information 123 (shown in FIGS. 3A and 3B) for a selected expert from a pool of experts. Expert information 123 includes at least one of a photograph of expert 852, an identification of expert 854, a location of expert 856, a sub-business of expert 858, a business of expert 860, a communication language of expert 862, contact information 864, a function section 866, an expertise section 868, an expert in section 870, a monthly availability calendar 872, a cases solved by expert hyperlink 874, a feedback of expert from other users hyperlink 876, favorite links and documents selected by expert 878, various computer languages and programs that the expert is available 880, and whether the expert is available by e-mail 882, chat 884, or phone 886.

Figure 11:
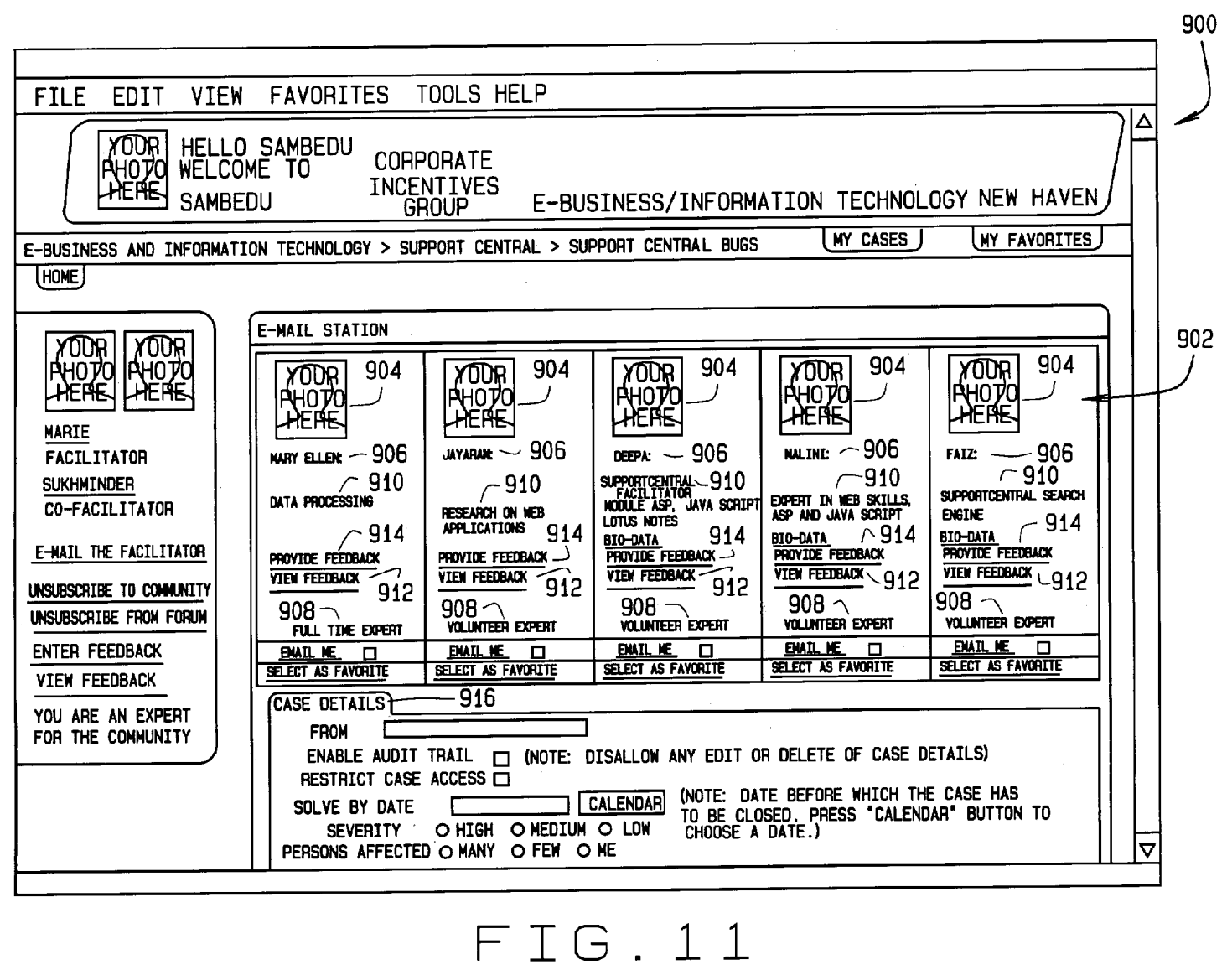

FIG. 11 illustrates an exemplary embodiment of a user interface 900 that displays a top five experts 902 matching a selection criteria in a selected community. Server system 12 (shown in FIGS. 3A and 3B) includes a processing component 76 (shown in FIGS. 3A and 3B) for searching and processing received queries against the expert information 123 (shown in FIGS. 3A and 3B) stored in database 20. Processing component 76 compares user information 100 (shown in FIG. 3A) which includes location of user 124, sub-business of user 126, business of user 128, and communication language of user 130 to expert information 123 (shown in FIGS. 3A and 3B) which includes at least one of identification of each expert 132, type of each expert 134, location of each expert 136, sub-business of each expert 138, business of each expert 140, schedule of each expert 142, shift timings of each expert 144, communication language of each expert 146, and availability of each expert 148. The experts in the pool of experts having expert information 123 that most closely match user information 100 for a particular user are displayed on client system 14. In the exemplary embodiment, processing component 76 applies a selection criteria when comparing user information 100 to expert information 123, and sorts and displays the retrieved experts based on the selection criteria.

In the exemplary embodiment, the selection criteria employed by processing component 76 sorts and displays the retrieved experts based on first the type of expert 702 (shown in FIG. 6), e.g., "full-time" experts are displayed first and "volunteer" experts are displayed second, second by matching user communication language 130 (shown in FIG. 3A) with each available expert's communication language, third by matching user location 124, user sub-business 126, and user business 128 with each available expert's location, sub-business, and business. In other words, under the exemplary selection criteria, a "full-time" expert with the same communication language, location, sub-business, and business as the user would be displayed first on user interface 900. The "volunteer" experts with the same communication language, location, sub-business, and business as the user would be displayed secondly on user interface 900. All experts with the same location, sub-business, and business as the user would be displayed thirdly on user interface 900. Lastly, all experts in locations other than user location 124 with the same sub-business, and business as the user would be displayed on user interface 900. The selection criteria described herein is merely exemplary, and numerous other selection criteria could be employed which could result in sorting and displaying the retrieved experts in an order that is different than that described above.

User interface 900 also illustrates expert information 123 for each retrieved expert which includes at least one of a photograph of each expert 904, identification of expert hyperlink 906, type of expert 908, expertise hyperlink 910, view feed back hyperlink 912, and provide feed back hyperlink 914. Identification of expert hyperlink 906 further displays expert information 123 for the selected expert. User interface 900 also prompts the user with a case details pop-up box 916 which prompts the user to electronically transmit a message to a selected expert requesting assistance on a particular matter.

Figure 12:
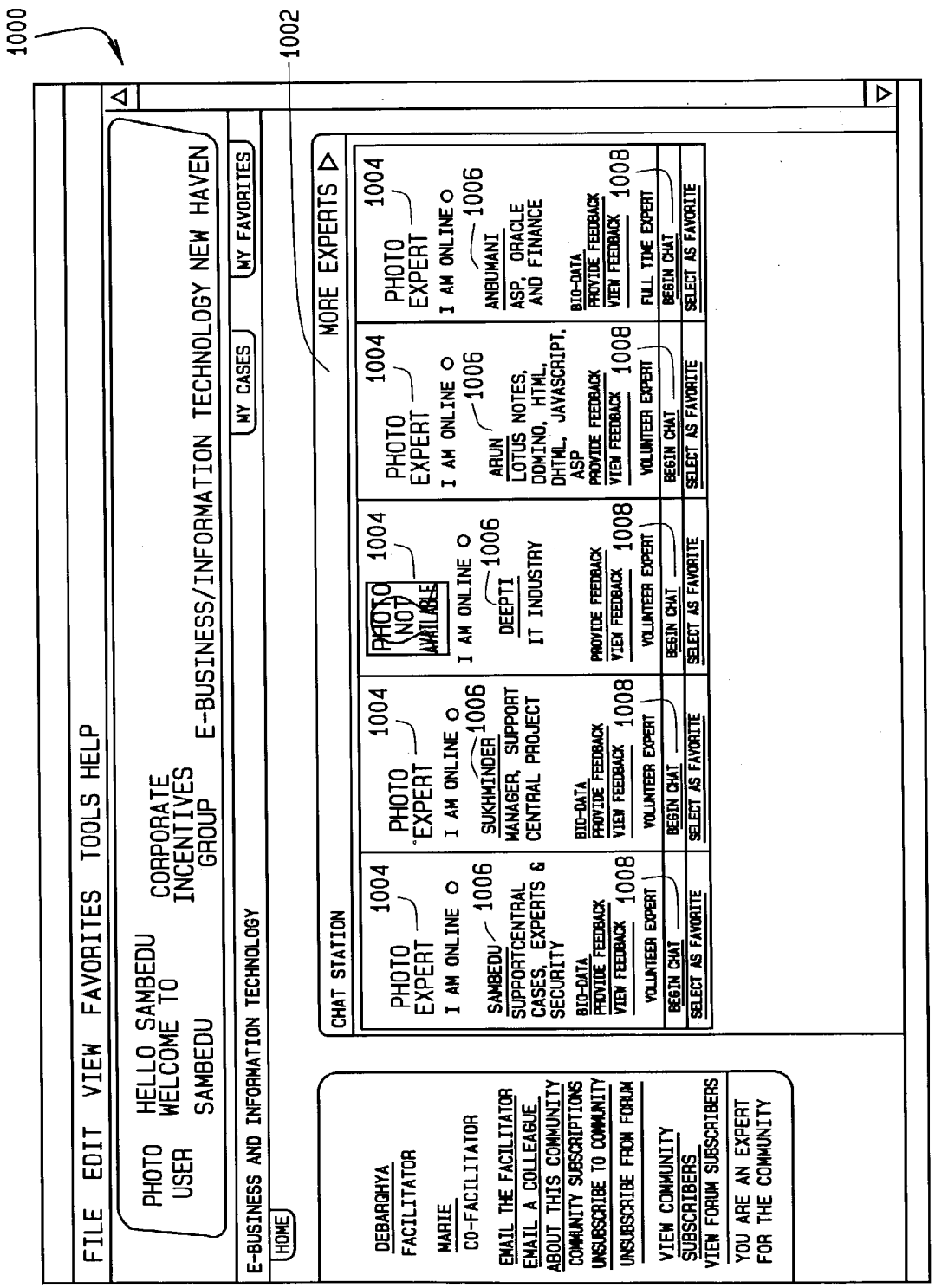
FIG. 12 is an exemplary embodiment of a chat room user interface.

FIG. 12 is an exemplary chat room user interface 1000. A selection of a chat feature by a user causes a pool of experts 1002 to be selected for an online meeting. Included in expert pool 1002 are photographs 1004 of the experts, areas of expertise and biographical data 1006, such as length of service and testimonials, on each expert, and a link 1008 to be used to engage the expert. Once the expert is engaged, a chat room window with a textual dialog box will display the textual interchange between the expert and the user. Multiple chat room windows can be used to engage a different expert and additionally, other experts can be invited into an active chat within one window by selecting an invite additional expert link. A user may also choose to end a chat with a particular expert.

Figure 13:
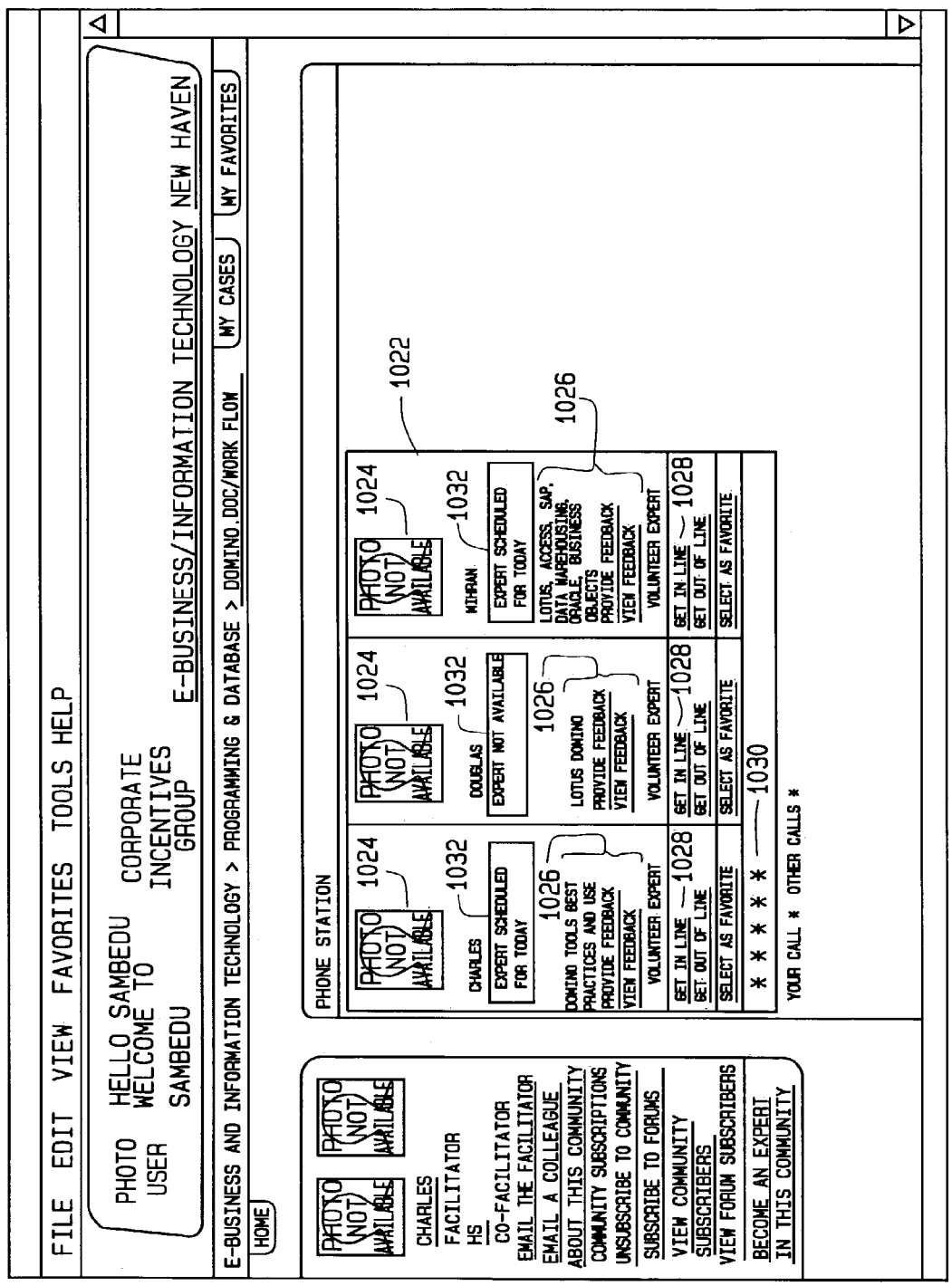
FIG. 13 is an exemplary embodiment of a telephone request user interface.

FIG. 13 is an exemplary phone request user interface 1020. A selection of a phone feature by a user causes a pool of experts 1022 to be selected for a telephone contact. Included in expert pool 1022 are photographs 1024 of the experts, areas of expertise and biographical data 1026, such as length of service and testimonials, on each expert, and a link 1028 to be used to call that expert. Also included in expert pool 1022 is a queue indicator 1030 which shows how many calls are in the queue of each expert and where the user's call is in relation to other calls in the queue. User interface 1020 also includes a box 1032 showing whether the expert is scheduled to provide assistance for that day.

Figure 14:
FIG. 14 is an exemplary embodiment of an e-mail request user interface.

FIG. 14 is an exemplary e-mail request user interface 1100. A selection of an e-mail feature by a user causes a pool of experts 1102 to be selected for an e-mail contact. Included in the expert pool 1102 are photographs 1104 of the experts, areas of expertise and biographical data 1106, such as length of service and testimonials, on each expert, and a link 1108 to be used to e-mail a request to that expert. Also included in expert pool 1102 is a pop-up box 1110 that allows the user to input the e-mail request to be sent to the selected expert.

FIG. 15 is an exemplary embodiment 1200 of an applet 1202, linked to database 20, to indicate expert's current availability. Applet 1202 indicates on user device 14 expert availability 1204 or unavailability 1206.

Applet 1202 is implemented with a Java Applet or a native program in C or any other appropriate programming language running in an Intel PC window under the Windows operating or any other computer operating system. A Java applet is executed by a web browser when the browser loads an HTML document that contains an applet tag. The applet tag defines the width and height of the applet window within the HTML document. The applet tag has numerous attributes to enhance its placement within the HTML document. In an alternative embodiment, this functioning does not necessarily need an applet and can be done in a variety of programming methods.

Database 20 tracks an expert's availability, as well as users who have indicated that they would prefer to chat with the expert. The amount of time each user has waited 1208 for a specific expert is also being tracked. Database 20 will consider the expert "unavailable" 1206 if the applet 1202 is not loaded or the computer 14 is off. Additional functionality exists within database 20 as well as server system 12 to indicate expert's availability. Database 20 is implemented using Oracle, but can be implemented on any available database or even with a flat file residing on any device 14. Database 20 consists of the tables with the identification of the experts and their availability. Applet 1202 communicates in both directions 1210 with database 20.

The applet utilizes a simple interface, consisting of a large button that toggles the expert's availability as 'on' or 'off,' as viewed by customers. It has a small "footprint" (i.e., 1 inch tall by 2 inches wide) 1212 so that it is visible at all times without being obtrusive, with an option to leave it "always on top" on device 14. The 'on/off' button comprises the majority of the applet's real estate, with additional space to be allocated for statistical information, such as viewing the number of people 1214 as well as names of people 1216 queued to chat. Additional functionality is built into the applet, if required.

With this system, the expert has full knowledge of the current activities to help manage their availability to customers and view vital statistics, all without the need of a web browser. Non browser-based applet 1202 interface is utilized to allow it to be "always on top" in order to prominently display availability 1204 and queue information 1214 without cluttering the experts' desktop device 14. The underlying database 20 updates the customer's window into an expert's availability in real time. In addition to displaying expert information on the client system based on the updated information from database 20, system 10 further displays previous customer interactions with the available experts within the expert pool. In an alternative embodiment, the information that is available in a non-browser environment is also provided to client system 14 having a browser.

While the invention has been described in terms of various specific embodiments, those skilled in the art will recognize that the invention can be practiced with modification within the spirit and scope of the claims.

What is claimed is:

1. A method for providing expert information from a pool of experts using a server system coupled to a centralized database and at least one client system, said method comprising the steps of:

storing expert information within the database including a pool of experts and information describing each expert included within the pool of experts, the expert information organized within the database in a plurality of business-related communities including at least one of information technology, finance, manufacturing, engineering, risk management, quality, human resources, environmental, health and safety, legal, and operations;

displaying information on the client system identifying alternative paths for assistance to a user, wherein the displayed information comprises the plurality of business-related communities;

receiving a request from the user using the client system including an alternative path selected by the user;

accessing the database with the server system;

cross-referencing information describing the user with the expert information stored within the database;

displaying expert information including expert availability information on the client system through an applet downloaded from the server system when the user calls upon an expert to seek assistance, wherein expert availability information includes whether the called upon expert is currently in communication with the client system and available to provide assistance to the user; and contacting the expert based on user selected expert information inputted into the client system.

2. A method according to claim 1 wherein receiving a request comprises:

receiving a selected community from the user using the client system; and receiving information describing the user from the user using the client system, wherein information describing the user includes at least one of a location of the user, a sub-business of the user, a business of the user, and a communication language of the user.

3. A method according to claim 1 wherein cross-referencing information describing the user with the expert information comprises:

comparing information describing the user including at least one of location of user, sub-business of user, business of user, and communication language of user to the expert information stored within the database including identification of expert, type of expert, location of expert, sub-business of expert, business of expert, schedule of expert, shift timings of expert, communication language of expert, and availability of expert;

retrieving available experts based on matching information describing the user with the expert information; and sorting the retrieved available experts based on a selection criteria.

4. A method according to claim 3 wherein the selection criteria comprises sorting the retrieved available experts by the type of expert, then by matching the communication language of the user and each available expert, and then by matching the location, sub-business, and business of the user and each available expert.

5. A method according to claim 4 wherein the selection criteria further comprises sorting the retrieved available experts by the type of expert and by matching the location, sub-business, and business of the user and each available expert.

6. A method according to claim 5 wherein the selection criteria further comprises sorting the available experts by matching the location of the user and each available expert.

7. A method according to claim 1 wherein said step of displaying expert information on the client system further comprises the step of displaying at least one of a photograph of each available expert, testimonials for each available expert, biographical data for each available expert, a length of service for each available expert, areas of expertise for each available expert, and previous customer interactions with each available expert.

8. A method according to claim 1 wherein said step of displaying expert information on the client system further comprises the step of displaying expert selected hyperlinks and documents.

9. A method according to claim 1 wherein said step of displaying expert information on the client system further comprises the step of displaying a calendar showing the days and times during which the expert is available to provide assistance to a user.

10. A method according to claim 1 wherein said step of displaying expert information on the client system further comprises the step of displaying which experts within the expert pool are available and which experts are helping other users.

11. A method according to claim 1 wherein said step of displaying expert information on the client system further comprises the step of displaying which experts within the expert pool are available and which experts are helping other users through an expert availability indicator displayed on the client system.

12. A method according to claim 1 wherein said step of displaying expert information on the client system further comprises the step of displaying availability information through an applet implemented in at least one of a well known programming language such as Java, C, and C++.

13. A method according to claim 1 wherein said step of displaying expert information on the client system further comprises the step of tracking expert availability.

14. A method according to claim 13 wherein said step of tracking expert availability further comprises the steps of:

tracking the availability of each expert in the pool of experts;

tracking users who are interested in contacting a specific expert;

tracking an amount of time each user has been waiting to connect with the specific expert; and displaying the expert availability on the client system.

15. A method according to claim 1 wherein said step of contacting an expert based on user input into the client system further comprises the step of using user input into a user interface to select an available expert or join a queue of an expert currently helping another user.

16. A method according to claim 15 wherein said step of contacting an expert based on user input into the client system further comprises the step of using user input to select an available expert or join a queue of an expert currently helping another user after having previously selected the queue of a different expert.

17. A system for providing expert information from a pool of experts, said system comprising:

a client system comprising a browser;

a database for storing expert information including a pool of experts and information describing each expert included within the pool of experts; and a server system configured to be coupled to said client system and said database, said server system configured to:

display information on the client system identifying alternative paths for assistance to a user;

receive a request from the user using the client system including an alternative path selected by the user;

access expert information stored within the database based on the alternative path selected by the user;

cross-reference information describing the user with the expert information stored within the database, wherein cross-referencing comprises comparing the information describing the user including at least one of a location of the user, a sub-business of the user, a business of the user, and a communication language of the user to the expert information stored within the database including identification of expert, type of expert, location of expert, sub-business of expert, business of expert, schedule of expert, shift timings of expert, communication language of expert, and availability of expert;

display expert information including expert availability information on the client system through an applet downloaded from the server system when the user calls upon an expert to seek assistance, wherein expert availability information includes whether the called upon expert is currently in communication with the client system and available to provide assistance to the user; and contact the expert based on user selected expert information inputted into the client system.

18. A system according to claim 17 wherein said client system further comprises at least one of:

a displaying component for displaying information identifying various alternatives to the user;

a sending component to send an inquiry to the server system so that the server system can process and download the requested information to the client system;

a collection component for collecting information from users into the centralized database;

a tracking component for tracking expert information;

a displaying component for displaying expert information;

a receiving component for receiving expert information including at least one of identification of each expert, type of each expert, location of each expert, sub-business of each expert, business of each expert, schedule of each expert, shift timings of each expert, communication language of each expert, and availability of each expert; and a contacting component for contacting a selected expert.

19. A system according to claim 17 wherein said server system further comprises:
 a receiving component for receiving an inquiry to provide information from one of a plurality of users;
 a processing component for searching and processing received inquiries against the database containing information collected by the collection component;
 a retrieving component to retrieve expert information from the database; and
 an information fulfillment component that downloads the requested information after retrieving from the database.

20. A system according to claim 17 wherein said server system further comprises a receiving component that receives an inquiry from the client system regarding at least one of a plurality of communities including at least one of information technology, finance, manufacturing, engineering, risk management, quality, human resources, environmental, health and safety, legal, and operations.

21. A system according to claim 17 wherein said server system further comprises a receiving component configured to:
 display a plurality of communities on the client system including at least one of information technology, finance, manufacturing, engineering, risk management, quality, human resources, environmental, health and safety, legal, and operations;
 receive a selected community from the client system; and
 receive information describing the user from the client system including at least one of a location of the user, a sub-business of the user, a business of the user, and a communication language of the user.

22. A system according to claim 17 wherein said server system is further configured to:
 retrieve available experts based on said comparison of the information describing the user to the expert information; and
 sort the retrieved available experts based on a selection criteria.

23. A system according to claim 22 wherein said selection criteria comprises sorting the retrieved available experts by the type of expert, then by matching the communication language of the user and each available expert, and then by matching the location, sub-business, and business of the user and each available expert.

24. A system according to claim 23 wherein said selection criteria further comprises sorting the retrieved available experts by the type of expert and by matching the location, sub-business, and business of the user and each available expert.

25. A system according to claim 24 wherein said selection criteria further comprises sorting the retrieved available experts by matching the location of the user and each available expert.

26. A system according to claim 17 wherein said server system further comprises an information fulfillment component configured to provide a user with a list of available experts and a list of experts that are helping other users on said client system.

27. A system according to claim 26 wherein server system further comprises an information fulfillment component configured to provide a user with an option of selecting an available expert or to join a queue of an expert currently helping another user.

28. A system according to claim 27 wherein said server system further comprises an information fulfillment component configured to provide a user with an option of selecting an available expert or join a queue of an expert currently helping another user after having previously selected the queue of a different expert.

29. A system according to claim 27 wherein the expert information stored within said database further comprises at least one of a photograph of each available expert, testimonials for each available expert, biographical data for each available expert, a length of service for each available expert, areas of expertise for each available expert, and previous customer interactions with each available expert.

30. A system according to claim 17 wherein the expert information stored within said database further comprises expert selected hyperlinks and documents for each expert in the pool of experts.

31. A system according to claim 17 wherein the expert information stored within said database further comprises a calendar showing the days and times during which each expert is available to provide assistance to a user.

32. A system according to claim 17 wherein said server system is further configured to allow the user to engage an expert by exchanging textual messages.

33. A system according to claim 17 wherein said server system is further configured to allow the user to engage an expert by telephone.

34. A system according to claim 17 wherein said server system is configured as a server system for a network of client devices.

35. A system according to claim 34 wherein said server system and said client system are connected via a network.

36. A system according to claim 35 wherein said network is at least one of a wide area network, a local area network, an intranet, and the Internet.

37. A system according to claim 17 wherein said server system is further configured to display which experts within the expert pool are available and which experts are helping other users through an expert availability indicator displayed on the client system.

38. A system according to claim 37 wherein said server system is further configured to display availability information through an applet implemented in at least one of a well known programming languages such as Java, C, and C++.

39. A system according to claim 17 wherein said server system is further configured to track expert availability.

40. A system according to claim 39 wherein said server system configured to display expert availability is further configured to:
 track the availability of each expert in the pool of experts;
 track users who are interested in contacting a specific expert;
 track an amount of time each user has been waiting to connect with the specific expert; and
 display the expert availability on the client system.

41. A system according to claim 17 wherein said server system further configured to contact an expert based on user input into the client system.

42. A system according to claim 41 wherein said server system further configured to use user input from a user interface to select an available expert or join a queue of an expert currently helping another user.

43. A system according to claim 17 wherein said server system further configured to contact an expert based on user input from the client system to select a free expert or join a queue of an expert currently helping another user after having previously selected the queue of a different expert.

* * * * *